Aug. 8, 1939.  J. H. CHAPLIN  2,168,439
SAFETY LOCKING MEANS FOR SPEED VARIATING MECHANISM
OF LIQUID DISPENSING APPARATUS
Filed June 5, 1937    2 Sheets-Sheet 2
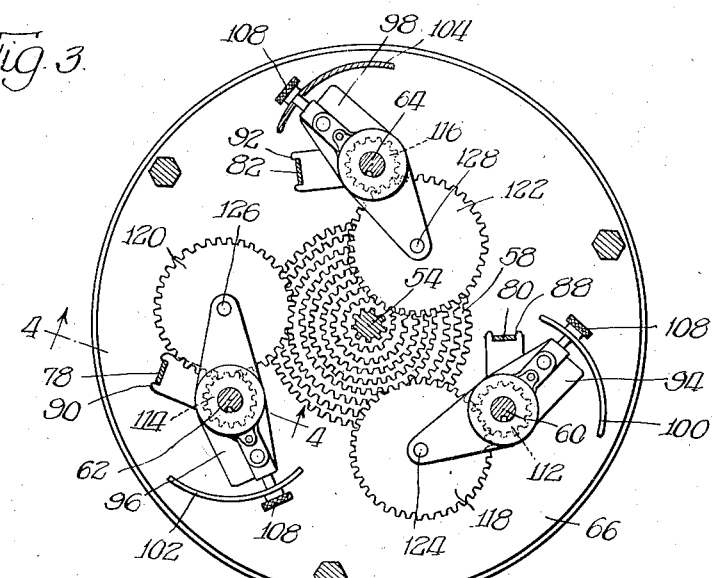
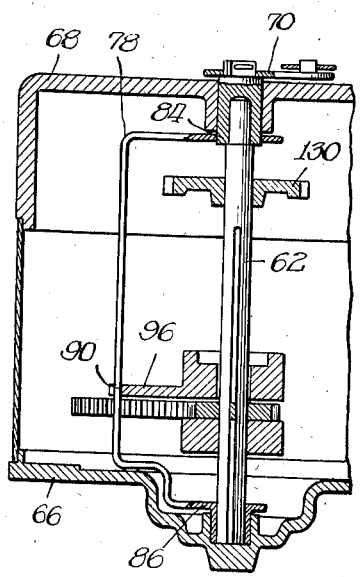
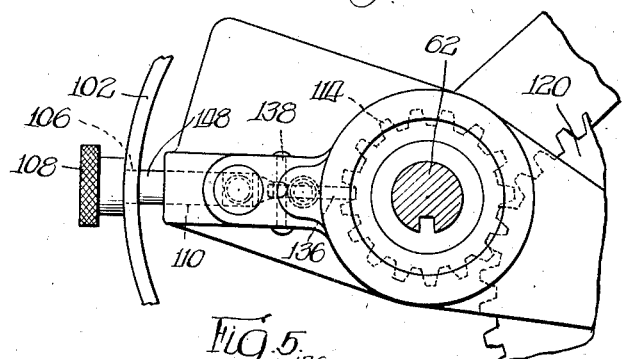
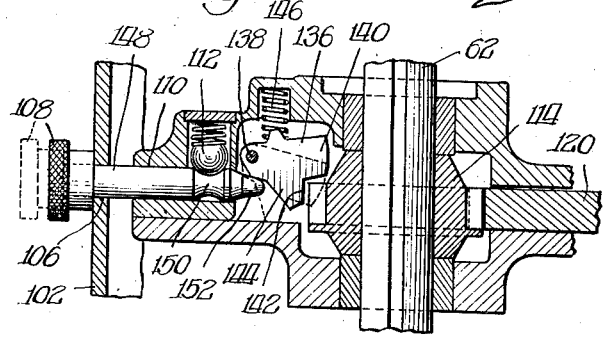
Inventor:
John H. Chaplin,
By Atkinson, Huxley, Bryon & Knight
attys.

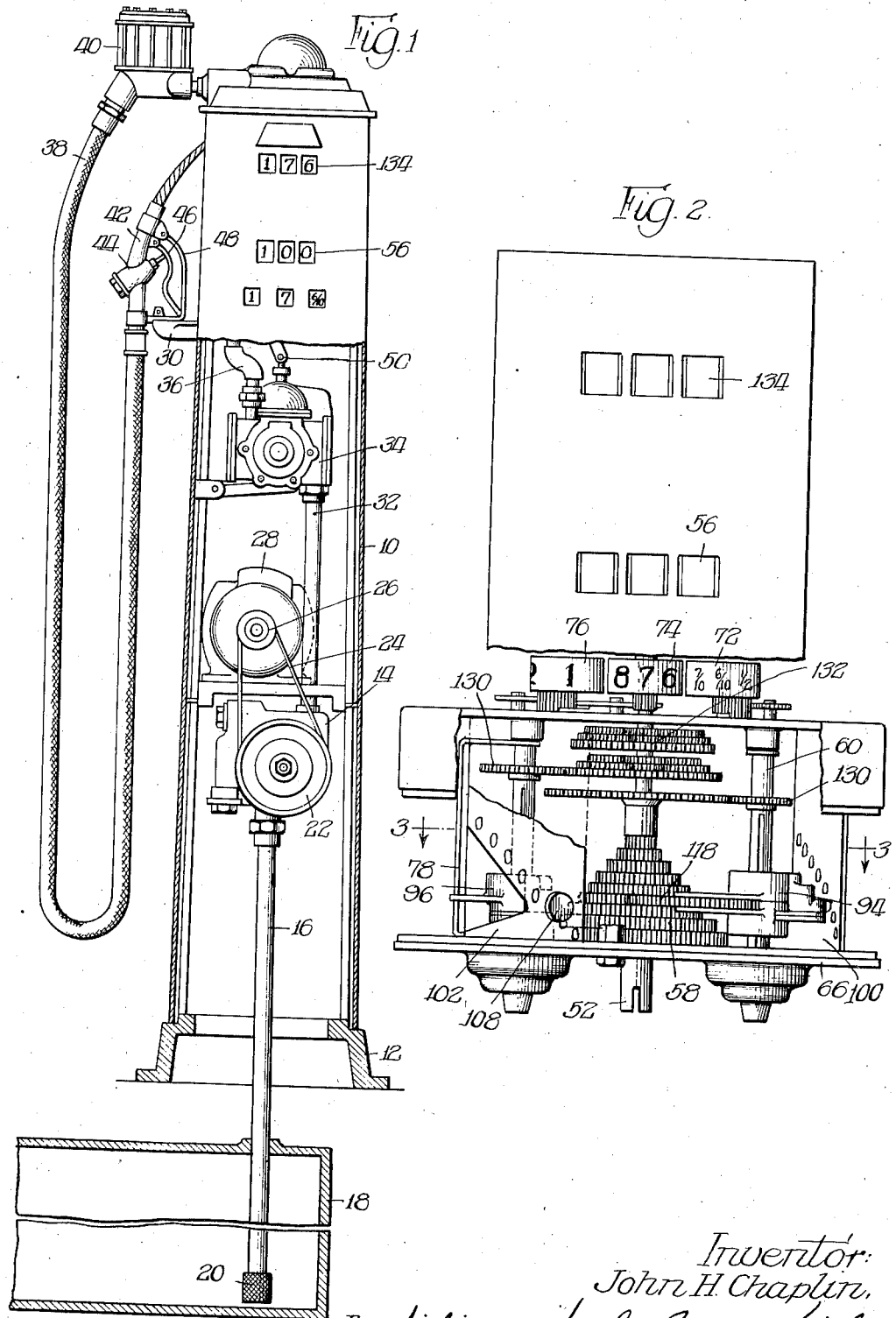

Patented Aug. 8, 1939

2,168,439

UNITED STATES PATENT OFFICE

2,168,439

SAFETY LOCKING MEANS FOR SPEED VARIATING MECHANISM OF LIQUID DISPENSING APPARATUS

John H. Chaplin, West Hartford, Conn., assignor, by mesne assignments, to The Wayne Pump Company, Fort Wayne, Ind., a corporation of Maryland Application June 5, 1937, Serial No. 146,677

4 Claims. (Cl. 74—348)

This invention pertains to liquid dispensing apparatus and more particularly to range gear locking means for the speed variator of a liquid dispensing apparatus.

In the computing type of meter liquid dispensing apparatus now most prevalent, the apparatus embodies indicating means for showing the price of the liquid dispensed, the number of gallons dispensed, and the current price of said liquid. The indicator is operated through a variator, which in turn is driven by a meter through which dispensed liquid passes to the dispensing hose, the liquid being supplied to said meter by some means such as a driven pump connected to a suitable source of supply. The price of the liquid of course changes from time to time, and the variator must be set accordingly. With the variators now more commonly in use the variator is supplied with a range arm or gear shifting lever which is held in selected price position by means of a pin which extends through a suitable calibrated range plate or quadrant. If the pin is omitted, or if the pin is not inserted securely, a faulty setting is made which may or may not be readily visible on the daily price indicating means.

It is therefore an object of this invention to provide a range gear locking means which permits operation of its associated part of the variator only when a proper setting and securing of the setting is effected.

Another object is to provide means for insuring the authorized and proper setting of a computing type of liquid dispensing apparatus.

Still another object is to provide latching means for preventing dispensing of liquid or registration of a liquid dispensing apparatus unless a proper setting of the calculating mechanism has been effected.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

Figure 1 is a fragmentary sectional elevation of a liquid dispensing apparatus of the computing type to which the invention is applied;

Figure 2 is an enlarged fragmentary sectional elevation through the variating means of a computing type of liquid dispensing apparatus embodying the invention;

Figure 3 is a sectional top plan view through the variator, the same being taken substantially in the plane as indicated by line 3—3 of Figure 2, the same showing the range arms in set position;

Figure 4 is an enlarged fragmentary sectional elevation through one of the range arms and supplementary shafts of the variator, the same being taken substantially in the plane as indicated by the line 4—4 of Figure 3;

Figure 5 is an enlarged fragmentary sectional elevation through one of the range arms, the same showing the range gear locking device in inoperative position, that is, where a correct setting has been made;

Figure 6 is an enlarged fragmentary top plan view of the range arm and locking device therefor illustrated in Figure 5.

In the computing type of liquid dispensing apparatus illustrated, said apparatus consists essentially of a casing or standard 10 supported on the base 12 and within said casing there is mounted a pump 14 the suction side of which is connected through a suitable pipe 16 to a source of liquid supply such as the underground tank 18 through the footvalve 20. The pump is provided with the pulley 22 the rotation of which causes operation of the pump, said pulley being adapted to be rotated by the belt 24 passing over the pulley 26 of the motor 28, the motor being suitably operated by switch control means (not shown) disposed adjacent the stationary hose support 30. The outlet side of the pump is connected through the pipe 32 to the inlet side of the meter 34. The liquid passes through the meter 34 and outwardly through the outlet thereof, and through the pipe 36 to the dispensing hose 38 through the sight gauge 40. The dispensing hose 38 is provided with the usual dispensing nozzle 42 which is provided with the dispensing valve 44 operated by the lever 46 provided within the supporting guard 48.

When the nozzle is hung in supported position on the supporting hose hook 30, as shown in Figure 1, the switch is rendered inoperative, and it is only after removal of the hose that the pump can be started and liquid dispensed by operation of the valve 44. The passage of liquid through the meter 34 causes rotation of the meter shaft 50 which is connected to the coupling 52 of the driving shaft 54 of the variator. The driving shaft 54 is connected through a suitable connection with the quantity counters 56 of the indicating means, said indicating means being described generally in application Serial No. 23,742, filed May 27, 1935.

In the type of variator shown, concentric gears or a gear cone 58 are provided on the driving shaft, and a plurality (shown three) of supplementary shafts 60, 62 and 64 are mounted adjacent the driving shaft and journaled in suitable lower and upper plates 66 and 68 of the variator. These shafts may be designated respectively as the tenths cent shaft, the cent shaft, and the tens of cents shaft. The upper ends of the shafts are provided with cranks such as the crank 70, which are suitably connected respectively to the tenths cent numeral wheels 72, the cent numeral wheels 74 and the tens of cents numeral wheels 76 so that the position of the shafts 60, 62, and 64 will rotate the indicating wheels 72, 74 and 76 a corresponding amount to indicate the proper setting of said shafts. This setting means is particularly shown and described in the above identified application.

Each of the cranks, such as crank 70, is adapted to be moved by the respective bails 78, 80 and 82, which bails are fixedly secured adjacent the upper ends thereof to the member 84 journalled in the upper plate 68 and fixedly secured to the respective crank, members 84 forming a journal for the upper ends of the relatively rotatable supplemental shafts 60, 62 and 64. The lower ends 86 of the bails are journalled in the lower plate 66 and form bearings or journals for the lower ends of said supplemental shafts. Said bails are slidably engaged as at 88, 90 and 92 by the respective gear shifting levers 94, 96 and 98 which are slidably mounted on the respective supplementary shafts. The gear shifting levers are mounted adjacent the range plates or price calibrated quadrants 100, 102 and 104 fixedly mounted on the base plate 66. Said quadrants are provided with suitable apertures 106 disposed at the proper calibrations and being adapted to receive the positioning or range pins 108 inserted in the selected apertures and being adapted to be received in a corresponding socket 110 provided in the respective range arms whereby when said range pins are removed from the selected apertures 106 and socket 110 the gear shifting levers may be slid along the respective supplemental shafts, but when said pins are received in said apertures and socket the levers are fixed against movement.

The range arms embrace slidable pinions 112, 114 and 116 slidably but non-rotatably mounted on the respective supplementary shafts. Said pinions are adapted to be rotated by pinions 118, 120 and 122 pivoted as at 124, 126 and 128 to said range arms and being adapted to engage selected gear steps of the gear cone 58, the selected step being determined by the selected aperture 106 of the respective range quadrants. The supplementary shafts are provided with suitable gearing such as indicated at 130 which is adapted to rotate a suitable differential 132, said differential being connected to the price indicating wheels 134, all as particularly shown and described in said above identified application and in application Serial No. 628,868, filed August 15, 1932.

The range arms are provided with the range pin receiving socket 110 and the spring pressed ball 135 which is disposed adjacent said socket 110. Inwardly of said ball there is provided a latch 136 pivoted to the range arm as at 138, said latch being provided with a locking edge 140 and the interrupted portion 142 disposed adjacent the stop lug 144. The latch is normally urged downwardly by means of the spring 146 disposed in said range arm. The pin 108 is provided with the body portion 148 having the cut out portion 150 for the reception of the spring pressed ball 112 and being provided with the cam end 152 adapted to extend within the latch space and engage the latch 136 to move the same upwardly until the cut out portion 142 registers with the teeth of the adjacent pinion 114 to thereupon unlock the shaft 62.

In the setting of the variator, if the pin 108 is not inserted in the respective sockets 110 to its full extent, the latch 136 will be in its downward position as shown in Figure 5, that is, the lower dotted line position in which the stop lug 144 engages the range arm and the locking edge 140 will engage the gear 114 to lock the shaft 62 against movement; and, if no pin is inserted at all, movement of the driving shaft may permit the released range arm to drop to its lowermost, or zero position, which will be indicated on the daily price synchronizing wheel 72, 74 or 76, or, in the event that the respective gears 118, 120 and 122 are not released from the cone, as for example, where the pin 108 is only partially inserted, the driven shaft will be rendered inoperative, and the indicator cannot be driven as the cone will also be locked. In the event friction prevents the unfastened range arm from dropping, and the gears 118, 120 or 122 do not engage the cone, the arm will be in such position that the respective daily price numeral wheel 72, 74 or 76 will not exactly register a numeral, which will be notice that a correct setting of the variator must be made. In the latter instance it has been found that no number will appear in the dial face so that the operator will know that that particular gear shift arm is not functioning, i. e., is at zero setting. For example, referring to Figure 1, if the tenths arm is not properly set no registration, or an unreadable registration, will appear in the tenths daily price window so that the variator will be set to compute at seventeen cents, and not seventeen and six-tenths cents as shown.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is—

1. In a device of the character described, the combination of a driving shaft, a driven shaft, said driving shaft having concentrically arranged gear teeth thereon, a supplementary shaft disposed adjacent said driving and driven shafts, connecting means between said supplementary shaft and said driven shaft, shiftable means on said supplementary shaft having means engaging said gear teeth, a driven gear on said supplementary shaft, a calibrated range plate disposed adjacent said shiftable means, latching means on said shiftable means for locking said supplementary shaft, and means cooperating with said range plate and shiftable means for selectively rendering said latching means inoperative.

2. In a device of the character described, the combination of a driving shaft, a driven shaft, said driving shaft having concentrically arranged gear teeth thereon, a supplementary shaft disposed adjacent said driving and driven shafts, connecting means between said supplementary shaft and said driven shaft, shiftable means on said supplementary shaft having means engaging said gear teeth, a calibrated range plate disposed adjacent said shiftable means, a pin for securing said shiftable means to the range plate in the selected calibration, and means for locking said driving shaft unless said pin moves said last named means to a predetermined position.

3. In a device of the character described, the combination of a driving shaft, a driven shaft, said driving shaft having concentrically arranged gear teeth thereon, a supplementary shaft disposed adjacent said driving and driven shafts, connecting means between said supplementary shaft and said driven shaft, shiftable means on said supplementary shaft having means engaging said gear teeth, a calibrated range plate disposed adjacent said shiftable means, a pin for securing said shiftable means to the range plate in the selected calibration, and means on said shiftable means for locking said driving shaft unless said pin moves said last named means to a predetermined position.

4. In a device of the character described, the combination of a driving shaft, a driven shaft, said driving shaft having concentrically arranged gear teeth thereon, a supplementary shaft disposed adjacent said driving and driven shafts, connecting means between said supplementary shaft and said driven shaft, shiftable means on said supplementary shaft having means engaging said gear teeth, a calibrated range plate disposed adjacent said shiftable means, a pin for securing said shiftable means to the range plate in the selected calibration, and means on said shiftable means for locking said supplementary shaft unless said pin is disposed in a predetermined position.

JOHN H. CHAPLIN.